United States Patent [19]

Francois

[11] Patent Number: 5,232,396
[45] Date of Patent: Aug. 3, 1993

[54] MACHINE FOR REMOVING FISH, IN PARTICULAR WHAT IS LEFT ON THE BONES AFTER FILLETING, FROM THE BONES

[76] Inventor: Jean-Pierre Francois, 't Kloosterhof 19, B-8200 Brugge, Belgium

[21] Appl. No.: 859,295

[22] PCT Filed: Nov. 20, 1990

[86] PCT No.: PCT/BE90/00066
§ 371 Date: May 19, 1992
§ 102(e) Date: May 19, 1992

[87] PCT Pub. No.: WO91/07096
PCT Pub. Date: May 30, 1991

[30] Foreign Application Priority Data

Nov. 20, 1989 [BE] Belgium .................................. 8901236

[51] Int. Cl.⁵ ............................................. A22C 17/04
[52] U.S. Cl. ...................................... 452/136; 452/127; 452/139
[58] Field of Search .............. 452/127, 125, 135, 136, 452/142, 139

[56] References Cited

U.S. PATENT DOCUMENTS 3,542,105 11/1970 Townsend ........................... 452/127
3,733,997 5/1973 Beasley ................................ 452/127
4,602,404 7/1986 Betnar .................................. 452/161

FOREIGN PATENT DOCUMENTS 707962 7/1941 Fed. Rep. of Germany .

*Primary Examiner*—Willis Little
*Attorney, Agent, or Firm*—Kolisch, Hartwell, Dickinson, McCormack & Heuser

[57] ABSTRACT

A machine for removing fish, in particular what is left on the bones after filleting, from the bones, in which the machine comprises two shafts (4, 4') which are movable relative to each other and on which there are wheels (9) with knurled surfaces which can draw a fish bone over scrapers (14, 14') which are provided for the purpose and which scrape over the side bones and against the main bone along the top and along the bottom and left and right of the main bone, and by means of which fish is obtained in the form of strips with the original structure.

12 Claims, 3 Drawing Sheets

MACHINE FOR REMOVING FISH, IN PARTICULAR WHAT IS LEFT ON THE BONES AFTER FILLETING, FROM THE BONES

BACKGROUND OF THE INVENTION

Quite a large number of types of fish are commonly sold for consumption in the form of boneless fillets. These fillets are obtained by cutting the fish off along each side of the bones, so that a limited number of large pieces, slices or strips of boneless fish per filleted fish are obtained. Filleting takes place either on a small scale by cutting away the fish pieces by hand with a knife which may or may not specially provided for the purpose, or on a large scale with appliances or machines which automatically cut the fish fillets away from the bones. With each of these machines or appliances an effort is made to cut away as much of the fish as possible as fillets, in order to ensure that the proportion of the fish left behind on the bones—and involving a loss—is kept as small as possible. It is, however, impossible to remove all the fish during filleting, either by hand or mechanically, because the fillets are cut off along a straight line which does not run up against the bones of the fish at all points. Consequently, after filleting, apart from the fillets themselves, a fish bone to which a certain quantity of fish still remains clinging is obtained. This quantity of fish is situated mainly along the main bone of the fish, which is thicker than the side bones and consequently forms an angle with those side bones which is inaccessible for the filleting knife, lying in the lengthwise direction of the main bone. The object is then to prevent this part of the fish from being lost. A number of processes and machines with that object are also known, by means of which this quantity of fish is removed from the bones for processing into a saleable fish product.

The patent DE-PS-2823249 (with priority in the United Kingdom GB-23347/77) describes a machine and corresponding process in which the bond between bones and fish is weakened in the first instance through heating, and the fish is then removed from the bones by means of liquid jets or air jets, this machine also being provided with a beating device for further weakening the bond between the bones and the fish mechanically after heating.

The end product is a quantity of boneless fish which is made up of small pieces and is more or less cooked, which then cannot, of course, be sold as a fillet, but has to be processed further to a fish product which in its composition does not require the fish to have its original structure (e.g. pies and the like).

French patent FR-8703464 describes another machine and process by which the side bones are cut off along both sides of the main bones, by having the bones (with the remaining fish parts after filleting) carried along on a conveyor belt, at right angles to the direction in which two circular, rotary knives situated along either side of the path of the main bone are disposed. This process then permits a further recovery-not constituting part of this patent-of the fish on the side bones. Here again, fish in the form of fillets as the end product is not obtained, since the side bones of the fish still form part of the parts cut off and require a further treatment.

In the patent application DE-AS-2714101 a machine equipped as described above is improved with a device which automatically adjusts the distance between the individual knives of the cutting device to the measurements of the fish. The disadvantage here again is that the end product is not fish in the form of fillets.

The patent U.S. Pat. No. 4,151,629 describes a machine which cuts the fish of lower quality from the bones, and then removes the fish of good quality from the remaining part of the bones. The way in which the remaining part of the bones. The way in which the latter happens does not form part of this patent.

U.S. Pat. No. 4,481,693 also describes an apparatus which presses the fish off the bones by having it conveyed between at least two pairs of rollers with elastic surfaces and turning in opposite directions. Here again, the fish does not retain its original structure, but is flattened by the roller surfaces and pressed in pieces from the bones.

Finally, there is another known process for removing the remaining fish from the bones after filleting, which is described in the patent DE-PS-3516623. This process is used with a machine consisting of hollow drums which in their wall surface are provided with small openings. The bones to which fish is clinging are pressed with great force against this wall through the fact that they lie on a conveyor belt which runs pressed against these drums. In this way the fish is pressed through the openings, apart from the bones, which are left behind on the conveyor belt and are carried along. The boneless fish pulp is then recovered from the hollow drums. This machine and process also produce an end product which is not fish which has retained its original structure in the end product, but a pulp.

According to the known processes and machines or appliances for removal of the remaining fish, after filleting from the bones, fish which has still retained its original structure and can be sold as fillets in the form of strips or slices is not therefore obtained in a single case.

OBJECT OF THE PRESENT INVENTION

The purpose of the invention is to provide a machine for removing the fish remaining on the bones after filleting from the bones, while retaining its original structure, in the form of strips.

The object of the invention is a machine for removing fish remains from the bones in the form of strips, in particular as regards the fish remaining on the bones after filleting. The advantage of the machine according to the invention lies in the fact that fish strips which still have their original structure, and which can consequently be sold as fillets, are obtained. This machine is characterized in that it comprises two parallel shafts lying directly opposite each other, each of which is provided, approximately in the center, with a set of two wheels with knurled surfaces, each wheel on one shaft coming to lie directly opposite an identical wheel on the other shaft, while a small space is provided between the wheels adjacent to each other on the same shaft.

Provision is also made between the two shafts for a transmission device which transmits a rotary movement from one shaft to the other shaft, while said transmission device is made in such a way that the two shafts can move within certain limits towards or away from each other without the transmission of the rotary movement being thereby disrupted.

The two shafts are pressed towards each other by a spring force, in which process in the closest together position of the shafts, the wheels with knurled surfaces fixed thereon come to lie close up to and opposite each other and, through their opposite directions of rotation, can drag along a fish bone between their knurled surfaces. The differences in thickness which inevitably occur in a fish bone are allowed for through the fact that at least one shaft is movably disposed by its ends in a slit and can be moved against the spring force in such a way that the distance between the wheels with knurled surfaces can increase through the thickness of the bone lying between the wheels with knurled surfaces, or can decrease again as a result of the spring force.

Situated in front of these two shafts, along the side where the fish is taken between the wheels with knurled surfaces, are four scrapers, arranged in such a way that they scrape the bones of a fish bone which is advanced until it lies with the side bones parallel to the shafts between the wheels with knurled surfaces. For this purpose, these scrapers are situated with their scraping sides facing each other, in pairs on a line parallel to the shafts, at the level of the four wheels with knurled surfaces, a short distance in front of them, in such a way that it is possible to determine a plane running between the scraping edges of said scrapers and between the wheels with knurled surfaces, and thus lying substantially at right angles to the plane in which the two shafts lie.

One of the pairs of scrapers lying on a line parallel to the shafts is in this case situated slightly further from the wheels with knurled surfaces than the other pair.

Furthermore, at least one of the pairs of scrapers lying on a line parallel with the shafts is not fixed to the machine, but they are fitted so that they can each move individually in such a way that each scraper of that pair can move further from and closer to the opposite scraper of the other pair as a result of the differences in thickness of the bone, while provision is also made for a device which can move these movable scrapers a relatively great distance from the other pair and hold them there for inserting the bones between them.

The above-mentioned scrapers are in this case of such a shape that, viewed in the plane parallel to the shafts, they are more or less the shape of a semi-ellipse, cut through along the longest axis, the curved sides forming the scraping sides which in the case of two scrapers lying opposite each other face each other, and the straight sides running more or less parallel to the shafts.

The above-mentioned scrapers are also curved in the two directions running at right angles to the plane in which the shafts lie, and directed away therefrom, so that, on the one hand, a spoon shape is obtained, which faces in the opposite direction to that of the movement of the bones and touches the surface of the side bones and, on the other hand, each pair of scrapers lying on a parallel with the shafts with their points facing each other face away from the shafts, so that they touch the side edges of the main bone, in the opposite direction to that of the movement of the bones.

The fish bones are placed head first between the wheels with knurled surfaces and gripped by them. The main bone in this case is situated centrally in the space between two wheels lying on the same shaft, and the scrapers are placed in such a way that, through their curved shape, their scraping sides, on the one hand, follow the surface formed by the side bones and, on the other, scrape against the main bone, and due to the fact that with the scraping sides they are also curved in directions opposite to the direction of movement of the fish bone, the fish pieces are easily removed from them in the form of slices or strips.

Since the shafts can move in such a way relative to each other that the distance between the wheels with knurled surfaces increases or decreases, and are pressed towards each other by a spring force, the bones are always pressed equally firmly between the sets of gear wheels, irrespective of the thickness of the bone.

PREFERRED EMBODIMENTS OF THE INVENTION

For a better understanding of the invention a description is given below of a possible embodiment of the machine according to the invention, but without the invention being limited to this embodiment. The description is illustrated by reference to the appended figures.

Figure 1:
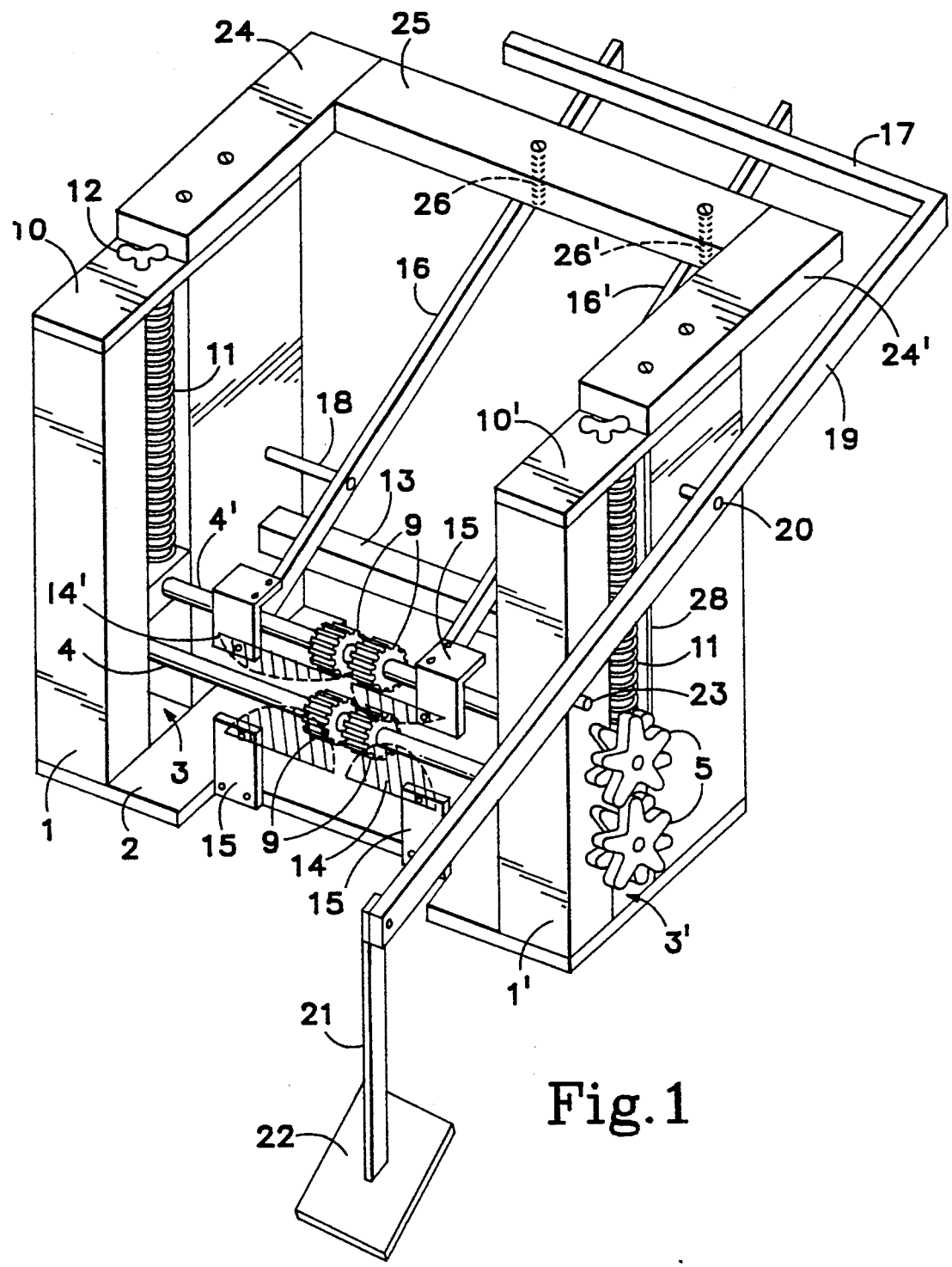
FIG. 1 is a perspective drawing of a possible embodiment of a machine for removing fish from the bones, in particular what remains on the bones after filleting, in the form of strips.

The machine according to the invention is characterized in that it comprises two structures (1) and (1') which are parallel to each other and directly opposite each other, and which are disposed with their lengthwise direction at right angles to a baseplate (2) and are fixed thereon by means of bolts and nuts, screws or similar fixing means.

These structures (1) and (1') are made bar-shaped and are arranged with their longest and broadest side faces vertical and parallel to each other. Provided transversely in said structures (1) and (1') is a recess (3) and (3') which is also bar-shaped and which runs from top to bottom and transversely through the parallel side faces, and forms a vertical slit (3) and (3') which is made at the same place for both structures (1) and (1') and consequently lies in a plane at right angles to the respective parallel side faces. The ends of two shafts (4) and (4') are now placed in said slits (3) and (3'), which shafts extend from one structure (1) to the other structure (1'), and thus come to lie above one another in a plane at right angles to the parallel side faces of the structure (1) and (1') and parallel to each other. These shafts (4) and (4') are each situated with their two ends in bearings fitting into the slits (3) and (3'). For the bottom shaft (4) these bearings are fixed in the slits (3) and (3'), while for the other shaft (4') these bearings are slidable in the slits (3) and (3'), guided in that movement by four slats arranged in each slit over the height of the slits (3) and (3'), abutting against the sides of the bearings lying parallel to the broadest sides of the structures (1) and (1'), at the level of the four corners thereof, and said slats, being disposed in the lengthwise direction of the slit, preventing the bearing from falling out of the slit at the side at any height.

The shafts (4) and (4') then run further through their bearings and project laterally through the slits (3) and (3') along the two parallel sides of the structure (1) and (1') furthest from each other. Along the two sides projecting through the slits (3) and (3') these shafts (4) and (4') are each provided with a double-row gear wheel (5), provided with two rows of teeth which are set obliquely relative to each other, and with those teeth being made longer than is usual in the case of a known gear wheel.

The end of the shaft (4) situated along one flank of the machine runs on further than the double-row gear wheel (5), unlike the shaft (4'), and at the end situated further on is provided with an ordinary gear wheel (6) while the ends of the shafts (4) and (4') situated along the other side do not run further than the double-row gear wheel (5). The gear wheel (6) meshes with the gear wheel (7), which lies in the same plane at right angles to the baseplate (2) as the gear wheel (6), and in turn is fixed on a horizontal shaft (8) at such a height that the teeth of the two gear wheels (6) and (7) are in contact with each other, so that rotary movements of the shaft (8) can be transmitted via the two gear wheels (6) and (7) to the shaft (4).

The shaft (8) is also driven by an electric motor (27). The sizes of the gear wheels (6) and (7), relative to each other, can in this case be calculated as a function of the speed of revolution of the motor (27) in such a way that the desired speed of the shaft (4) is obtained.

Each pair of meshing gear wheels (5) transmits a rotary movement of the shaft (4) to the shaft (4') through the fact that their teeth can engage in each other's corresponding tooth spaces. This meshing of the two gear wheel pairs, comprising gear wheels (5), is possible for different distances between the center points of the gear wheels, and thus for different positions of the slidable shaft (4'), due to the fact that their teeth are made long and the shaft (4') can thus slide over a relatively long distance with its bearings in the slits (3) and (3') without contact between the teeth of the two gear wheels (5) of a meshing set becoming impossible.

The two shafts (4) and (4') are in their center each provided with a pair of wheels (9) with knurled surfaces, the shafts (4) and (4') passing through the respective center points of the pair of wheels (9). The two wheels (9) with knurled surfaces are placed next to each other on the shafts (4) and (4') with a small horizontal space between them.

Each wheel (9) with knurled surface situated on one shaft—(4) or (4')—lies in the same plane, at right angles to the baseplate (2), as a wheel (9) with knurled surface lying opposite which is on the other shaft (4) or (4').

The horizontal space between the wheels (9) of the same shaft is normally set the same on the two shafts and can be altered on either shaft, according to the thickness of the main bone which is to be between them during the use of the machine. With that object, the wheels (9) with knurled surfaces sit on bushes which are slidable over the shaft and can be locked at a particular point on the shaft (4) and (4') by means of a screw or similar device.

The arrangement of the shafts (4) and (4') is further such that, when the bearings of the shafts (4) and (4') situated in the two slits (3) and (3') are lying against one another, the wheels (9) with knurled surfaces lying opposite each other lie on these shafts a short distance from each other, and only just not touching each other. This spacing can be altered by inserting plates between the bearings of the shafts (4) and (4').

The top faces of the two parallel structures (1) and (1'), which, of course, lie parallel to the baseplate (2), are each covered by means of a horizontal plate (10) lying on these top faces, each plate (10) being of the same length and width as the top face of the structure (1) or (1') which covers it.

These plates (10) consequently run over the top open sides of the slits (3) and (3') and shut the latter off.

Between the bearings of the top shaft (4') and the plates (10) covering the slits (3) and (3') at the top, the two slits (3) and (3') contain a coil spring (11) which at one side presses downwards on the two bearings of the shaft (4') and at the other side rests against the plates (10). Each coil spring (11) is provided at the top with a device which permits setting of the compression of the spring—and consequently the downward force exerted on the shaft (4')—through pressing the top side of said spring (11) downwards or allowing it to rise higher, it being possible for this setting to be carried out by means of a screw (12) or similar control device which can be turned by hand, while this screw (12) projects through plates (10) at the top and can produce a greater or smaller compression of the coil spring (11) by the turning of a hand-operated end. The spring (11) is held in the vertical position in the slit by the slats fixed in the lengthwise direction of the slit (3) and (3').

The machine according to the invention is further characterized in that a guide plate is fixed in between the parallel structures (1) and (1'), this plate extending parallel to the baseplate (2) from one structure (1) to the other structure (1'), abutting against the sides of these structures facing each other. This plate has a transverse L-shaped profile in which the flat sides form an acute angle and are fixed in such a way that the one flat side is directed downwards at an angle, facing away from the shafts (4) and (4'), and the other flat side is connected to this first one at an acute angle at the side thereof furthest away from the baseplate, and faces away from the shafts and runs parallel to the baseplate (2), while the fixing height of said guide plate (13) is such that the flat part running parallel to the baseplate (2) at least lies slightly higher than the lowest position of the shaft (4').

This guide plate (13) is fixed at the innermost flanks of the two parallel structures (1) and (1') by known fixing means (screws, bolts and nuts, welding etc.).

The machine is further characterized according to the invention in that the baseplate (2) on which the parallel structures (1) and (1') are fixed is provided with U-shaped recesses along the two sides running parallel to the shafts (4) and (4'). These recesses are made rectangular and run at right angles to the respective edge sides, in the center of said sides, so that bones and fish can fall separately into a receptacle placed underneath.

Along the side of the shafts (4) and (4') where the guide plate (13) is fixed this recess runs to through to the line of intersection of the baseplate (2) and the face at right angles thereto containing the edge of the guide plate (13) furthest away from the shafts, or to a short distance past this line of intersection.

Along the other side of the shafts this recess runs up to the line of intersection of the baseplate and the face at right angles thereto containing the two shafts (4) and (4'), or to a short distance before it.

The machine for removing remaining fish from the bones is further characterized in that it is provided with a scraping device with four scrapers (14) and (14'), and separately therefrom a lifting device for two of said scrapers (14'), with appropriate control means.

Figure 2A:
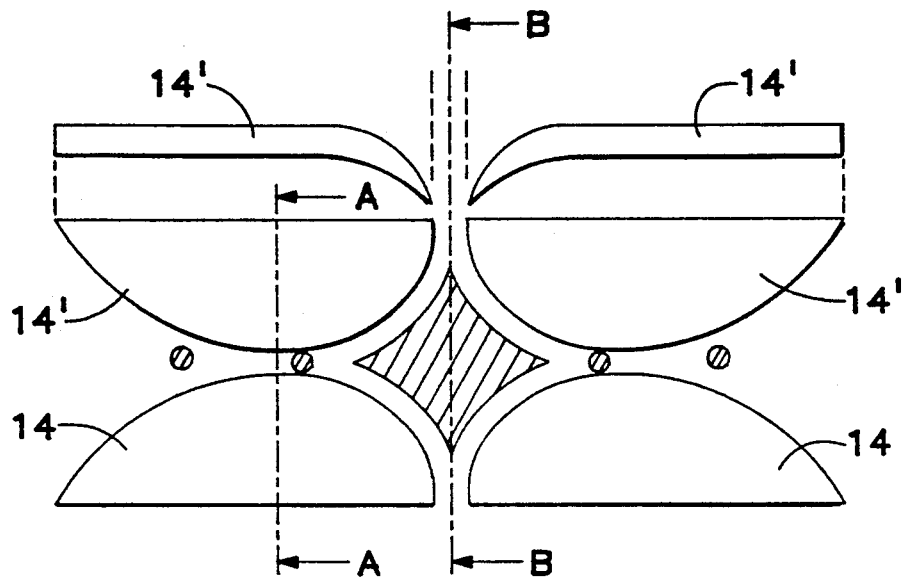
FIG. 2a is a front and a top view of the four scrapers according to the preferred embodiment according to the invention, in which the main bone and the side bones are shown in cross-section.
Figure 2B:
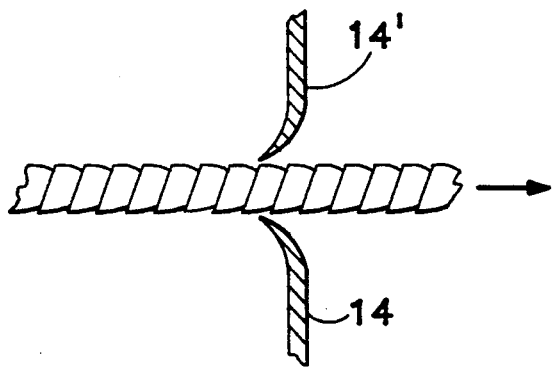
FIG. 2b is a cross-section of the scrapers (along the line AA in FIG. 2a) and the main bone (along the line BB in FIG. 2a) of the machine according to the invention.
Figure 3:
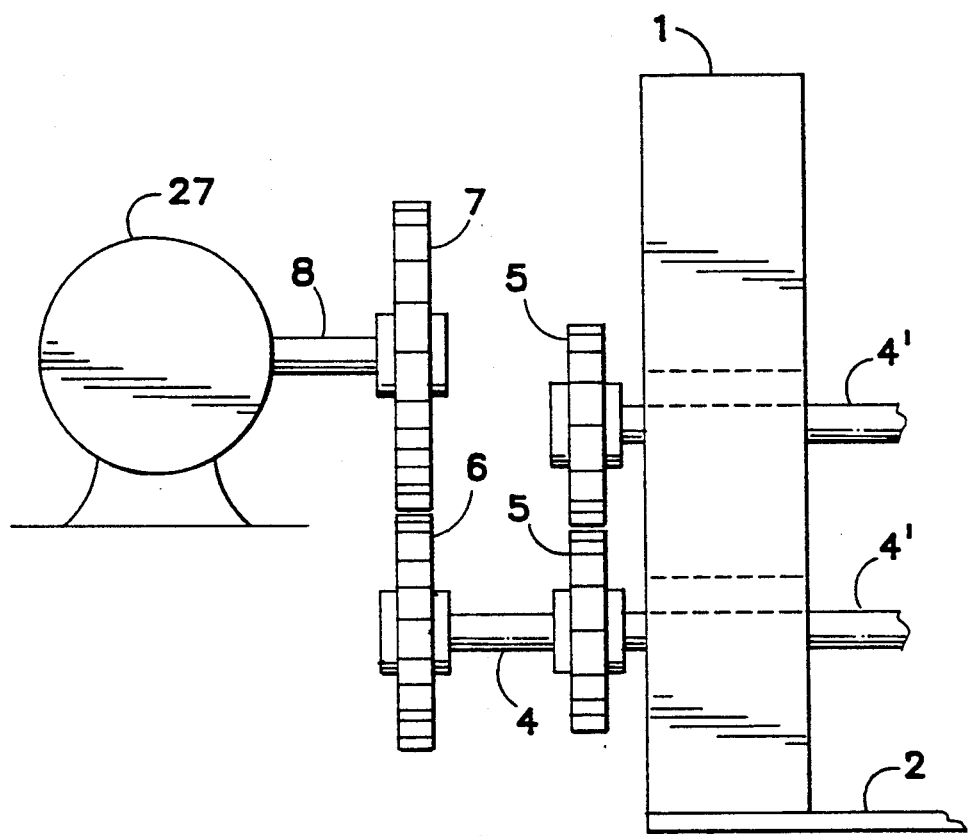
FIG. 3 is a front view of the part of the machine furthest left, as shown in FIG. 1, in which the drive gears and the drive motor can be seen.

The shape of these scrapers (14) and (14') is more or less that of an ellipse cut through along the longest axis, the curved side along one side merging into the straight side with a larger radius of curvature than along the other side, so that we obtain the shape of the cut face of an egg cut through in longitudinal section, while these scrapers thus formed are also curved in the two directions at right angles thereto—perpendicular to and parallel to their straight side—so that we obtain a curved profile both in top view and in cross-section (FIG. 2b). The curved edge of these scrapers (14) and (14') thereby forms the scraping side.

At one side we have a pair of fixed scrapers (14), each fixed along that side of the baseplate on a rectangular knife mounting plate (15) standing at right angles to the baseplate (2) against the edge of the recess situated parallel to the shafts (4) and (4').

The fixed scrapers (14) are fixed on the mounting plates (15) with their curved sides facing the shafts (4) and (4'), and with their straight sides more or less parallel to the shafts (4) and (4') and facing the baseplate (2), and with their scraping sides through their curvatures directed in two perpendicular transverse directions away from the shafts and both standing at approximately the same height—relative to the baseplate (2)—as the contact plane furthest from the baseplate (2) on the wheels (9) with knurled surfaces of the shaft (4), while each scraper (14) is situated directly in front of one of the wheels (9) with knurled surfaces of the fixed shaft (4), next to each other on a parallel with the shafts (4) and (4'), with the same distance between them as between those wheels (9) on the shaft (4). The scrapers (14) are fixed to the mounting plates (15) at one point by means of a screw or similar device and, after loosening of that fixing device, can be turned and fixed again in a position turned about that point, which makes it possible to set the optimum position of the scrapers (14) for different bone thicknesses and shapes, so that a maximum quantity of fish is removed.

The machine according to the invention is further characterized in that it is equipped with two individually movable scrapers (14') which are fixed on mounting plates (15') with an L-shaped transverse profile, each of said mounting plates (15') being fixed on the ends of lifting arms (16) and (16') of equal length which extend parallel in the lengthwise direction of the machine and towards the back form a right angle with an arm (17) extending above the lifting arms (16) and (16') and running parallel to the shafts (4) and (4'), starting off above the left lifting arm (16), forming a right angle therewith, running past the vertical plane in which the outermost flank of the structure (1') is situated, and running above the right lifting arm (16').

The lifting arms (16) and (16') are further rotatably fixed by means of pins (18) and (18') projecting horizontally from the innermost flanks of the structures (1) and (1'), while said pins (18) and (18') extend parallel to the shafts (4) and (4').

The arm (17) which runs above the lifting arms (16) and (16') and along one side up to the outermost flank of the structure (1') is laterally connected there at a right angle to the lever (19) running parallel to the outermost flank of the structure (1'), towards the front side of the machine, and rotatably fixed thereto by means of a pin (20) projecting horizontally from said flank.

The lever (19) runs above the gear wheels (5) further forward than the front flanks of the structures (1) and (1') and is connected at the front end to a control rod (21) running downwards, and hingedly connected to the front end of the lever (19).

This control rod (21) is provided at the bottom end with a control plate (22) which is connected, possibly at a slight angle, to the control rod (21).

Moving the control rod (21) upwards—using the control plate (22)—causes the lever (19) to be pushed upwards by its front end and to rotate about the pin (20), as a result of which the rear end and the arm (17) connected thereto are pushed downwards.

This arm then pushes the lifting arms (16) and (16') downwards, so that the scrapers (14') are moved upwards. These scrapers are situated on the mounting plates (15'), each of them directly above one of the scrapers (14) and lying slightly further forward. The scraping side faces downwards, and is also directed away from the shafts (4) and (4') due to the curvatures in two perpendicular transverse directions, while the adjustable fasting takes place in an identical manner to that of the scrapers (14).

The machine according to the invention is further characterized in that various scrapers are provided, with which the machine can be equipped, these scrapers differing from each other mainly in their lengthwise measurements—the length of their straight side—and consequently being useful if bones with widely varying widths of side bones are to have the remaining fish removed from them with the machine according to the invention, through the fact that ideally suitable scrapers for a particular width of bones can be fixed on the machine.

The lifting arms (16) and (16') are also placed in such a way that they lie symmetrically relative to the vertical plane of symmetry in the lengthwise direction of the machine, in such a way that each of the mounting plates (15') fixed on their ends with its downward-directed face lies vertically above a mounting plate (15'), so that vertically above each scraper it is possible also to fix a scraper (14') to the mounting plates (15'), in this case the possible regulation of the different settings of these scrapers (14') through their fixing to the mounting plates (15') being equal to that of the scrapers (14) through their fixing to the mounting plates (15'). Of course, said scrapers (14') are now set up with their scraping edge downwards and lying in front of the wheels (9) with knurled surfaces.

The shape of the scrapers (14') is identical to that of the scrapers (14). They are directed with their rounded side towards the shafts (4) and (4'), in front of said shafts and fixed upright on the mounting plates (15'), and with their straight sides facing upwards more or less parallel to the shafts (4) and (4'), so that the scraping edges of the scrapers (14) and (14') face each other and lie above one another in pairs.

The movable scrapers (14) and (14') are in this case situated slightly further from the shafts (4) and (4'), so that the four scrapers (14) and (14') do not lie precisely in a plane parallel to the plane in which the shafts (4) and (4') are situated, and the top scrapers (14') thus lie on a parallel line with the shafts (4) and (4') which is slightly further away from the shafts (4) and (4') than the parallel line with said shafts on which the bottom scrapers (14) are situated.

The scraping sides of the movable scrapers (14') through their curvatures in the two perpendicular transverse directions also face away from the shafts (4) and (4'), and are approximately at the same height—relative to the baseplate (2)—as the contact face on the wheels (9) with knurled surfaces of the shaft (4') which is closest to the baseplate (2) with the same space between as said wheels (9) on the shaft (4').

Through the free movements of the lifting arms (16) and (16'), the distance between every two opposite scrapers (14) and (14') can be altered separately from each other, as a result of the further discussed resilient adhesion of said lifting arms (16) and (16'), or as a result of the control device which makes the arms (16) and (16') rotate about the pins (18) and (18') through the downward movement of the arm (17) lying thereon.

The lever (19) runs along the sides of the structure (1'), at the side where the drive gear wheels (6) and (7) are not fixed and above the wheels (9) along that side, freely rotatable about the pin (20), while the front side of said lever (19) is limited to a lowest position by a locking pin (23) on which the lever (19) comes to lie. This locking pin (23) is fixed in the outermost flank of the structure (1'), high enough for the lever not to come into contact with the wheel (9) lying below it.

The machine according to the invention is further characterized in that it is equipped with a horizontal bar (24) and (24') which is connected to each structure (1) and (1') by known means, and which extends from the top rear part of the cover plates (10) backwards, each bar of the same length, at right angles to the direction of the shafts (4) and (4'). These bars (24) and (24') are then further connected to a transverse slat (25) running parallel to the shafts (4) and (4') above the arms (16) and (16').

The lifting arms (16) and (16') are each connected to this transverse slat (25) by springs (26) and (26'), these springs (26) and (26') being connected at one side to said transverse slat (25) in directions lying perpendicular to the transverse slat (25) and at the other side to the respective lifting arms (16) and (16').

The transverse slat (25) is in this case arranged at such a height above the arms (16) and (16') that the parts of the arms (16) and (16') lying below it do not touch the transverse slat (25) when the scrapers (14'), which are connected to the front part thereof, are in their lowest position—closest to the scrapers (14)—but are drawn upwards by the springs (26) and (26') until their ends press against the bottom side of arm (17).

The use of the machine according to the invention involves first of all switching on the electric motor (27), which by means of the shaft (8) and the gear wheel (7) fixed to said shaft (8) transmits the rotary motion to the gear wheel (6) and consequently also sets in rotation the shaft (4) and the gear wheels (5) connected thereto along two sides.

The gear wheels (5) on the shaft (4') which mesh with the gear wheels (5) on the shaft (4) are set in rotation by the latter, with the result that the two shafts (4) and (4') now rotate in opposite directions, and consequently also the wheels (9) with knurled surfaces situated centrally thereon, which lie above one another.

The fish is then placed over the scrapers (14) with its main bone at right angles to the direction of the shafts (4) and (4'), and with the head end of the bones between the wheels (9). For this, the movable knives (14') are moved up by pushing up the control plate (22), in order to be able to insert the fish bone between the scrapers. This fish bone is first carried between these wheels (9) and is firmly clamped between them, since the coil spring (11) presses the shaft (4') downwards, and consequently presses the wheels onto the fish bone, which is then clamped between the wheels (9).

The advantage of this is that any thickness of bone is clamped with the same amount of force and that thickness differences in that fish bone result in an immediate adjustment of the distance between the wheels (9), through the fact that the coil spring (11) is compressed to a greater or lesser extent. The pressure of the spring can always be adjusted by means of a screw (12) which presses the top end of the spring (11) downwards to a greater or lesser extent.

These constant distance variations between the shafts (4) and (4'), and thus also between the gear wheels (5), do not adversely affect the transmission of the rotary motion, owing to the fact that they are equipped with long teeth which remain in contact and can transmit the motion during any normally occurring distance between the shafts (4) and (4').

The scrapers (14) and (14'), which are situated below and above the fish respectively, through their curved shape of the scraping sides left and right of the main bone, follow the surface of the side bones along the top and along the bottom and left and right of the main bone, which lies in the space left clear between the wheels (9) disposed next to each other and, through the rounded shape of the knives, with the scraping side forward and curved so that it touches the surface of the bone, the fish remaining on the bones is easily removed therefrom.

The lifting device of the top movable scrapers (14') is provided with a control plate (22) which can be pushed upwards by the knee or thigh, so that the lever (19) pivoting about the pin (20) brings down the connecting arm (17). The lifting arms (16) and (16'), which are firmly fixed thereto, must follow downwards, against the spring force of the springs (26) and (26'). Rotating about the pins (18) and (18'), the front end of the lifting arms (16) and (16') moves upwards, so that the scraping sides of the scrapers (14) and (14'), which lie above one another, are moved further away from each other. This is necessary in order to move the scrapers far enough apart to permit placing of the bones between them.

If the control plate (22) is not pressed upwards, the lever (19) rests on the locking pin (23), and the arm (17) is in its highest position. The lifting arms (16) and (16') are drawn upwards by the springs (26) and (26') connected thereto until they are against the arms (17). Rotating about the pins (18) and (18'), the front end of the lifting arms (16) and (16')—and the scrapers (14') connected to said arms—is consequently in the lowest position, closest to the other, fixed scrapers (14).

Through differences in thickness occurring in the bones moving between the scrapers (14) and (14'), the position of the scrapers (14') can adjust automatically to those differences in thickness, due to the fact that the scrapers (14') can move up, so that the rear end of the arms (16) and (16') moves downwards against the spring force of the springs (26) and (26'). The scrapers (14') are pressed onto the bones as a result of that spring force.

During the use of the machine according to the invention the fish bones from which all fish has been removed pass into the recess in the baseplate (2) along the back relative to the shafts (4) and (4'), while the fish pieces, which are cut off in the form of strips, go along the front side of the scrapers (14) and (14') and fall into the recess in the baseplate (2) provided at that point. A collection tray is therefore placed below both recesses.

In another possible embodiment of the machine according to the invention, an additional set of gear wheels can be provided in front of the scrapers (14) and (14'), comprising two wheels rotating above one another and having knurled surfaces, or four such wheels lying in pairs vertically above one another, with a small, possibly adjustable space between these top wheels and the wheels lying vertically below them, these being driven by the same electric motor (27), and being provided in order to move the fish until it is past the scrapers (14) and (14'), carried between these additional wheels. In that case the fish does not have to be carried first by the wheels (9) before the scraping by the scrapers (14) and (14') begins, which results in easier insertion.

Other control facilities for raising and lowering the scrapers (14') are also achievable, making use of any combination of rods and/or levers in order to move the above-mentioned scrapers (14'), and possibly also the scrapers (14), up and down in a vertical plane.

For example, operation by hand, instead of operation with the leg, could be provided.

Another possible embodiment could be to make the movements of the scrapers (14') take place by means of electromagnets driven by a photoelectric cell which move the scrapers downwards after a bone is placed between them, and which raise them again when that bone has been moved past the scrapers. The scrapers are in that case fixed to arms which are moved by the electromagnets.

In another possible embodiment of the machine according to the invention, the machine can be provided for use with the shafts (4) and (4') and the scrapers (14) and (14') lying in a vertical direction, so that the bones have to be inserted along a vertical plane.

The working principle remains entirely the same, while only an additional guide must be provided to support the bones in their vertical position and guide them between the scrapers (14) and (14') and the wheels (9) with knurled surfaces, and the fastening of the baseplate must also be adjusted to the new direction of the machine.

It goes without saying that any embodiment of the machine according to the invention, of which one example was described here, lies within the scope of protection of this patent.

The advantage of the invention is that, making use of the machine according to the invention, fish or remaining fish can be removed from bones which still have fish pieces adhering to them after filleting, and fish strips with their original structure can be obtained as the end product, while the remaining bones have largely all the fish removed from them. The preferable application of the machine according to the invention is for the removal of fish pieces still remaining on the bones after the filleting of a salmon, in order also to obtain these pieces of the fish in the form of strips or slices, unlike the known machines, appliances and processes, which produce small pieces or pulp. The result of this is that the fish thus obtained can be sold at a higher price and can still be used for various dishes, through the fact that the original structure of the fish has been retained, unlike the fish pulp obtained with the other machines and appliances, which cannot be used for anything other than pies and similar dishes.

The device according to the present invention may further comprise auxiliary appliances in order to increase its efficiency.

It may include e.g. brushes for permanently cleaning the shafts and preventing that the pieces of fish remain on these shafts.

It may also include automatic cutting devices of the head and the tail of the fish as well as transportation means for the bones and the fish which has been cut thereof after passing through the device according to the invention.

Automatic control and safety devices may also be provided.

I claim:

1. The machine for removing fish remains, in particular what is left on the bones after filleting from the bones, characterized in that, it is equipped with at least two wheels (9), with their peripheral sides directly opposite each other, and with parallel shafts (4) and (4') and with rough, uneven or knurled surfaces of the peripheral sides, while situated upstream of those wheels (9), viewed from the direction of insertion of the bones, are two pair of lower scrapers (14) and of upper scrapers (14'), each scraper of a pair of scrapers (14 or 14') being situated with its scraping side directly opposite to the scraping side of a scraper of the opposite pair of scrapers (14' or 14), and each such scraper being parallel to the shafts (4) and (4') of the wheels (9), at the level of the wheels (9), a short distance in front of them, so that it is possible to determine a plane running between the scraping edges of said lower pair of scrapers (14) and said upper pair of scrapers (14'), and between the peripheral sides of the wheels (9) and lying at right angles to the plane wherein the shafts (4) and (4') lie, while the shafts (4) and (4') on which the wheels (9) are fixed symmetrically rotate in opposite directions, and the wheels here are at such a distance that a fish bone placed between them is pulled along by them, and the scrapers are disposed in such a way that they scrape over the side bones—along the top and along the bottom—and left and right against the main bone.

2. The machine of claim 1 wherein the scrapers of at least one pair of the scrapers (14') which are situated parallel to the shafts (4) and (4') of the wheels (9) are fixed on a structure which permits each individual scraper (14') of that pair to move freely and independently, so that the distance between the scraping sides lying opposite each other, through the bone moving between them, can be adjusted to the thickness of that bone, and is pressed thereon by a spring force, force of gravity or other force which acts on the structure and presses the scrapers towards each other on the bone surface.

3. The machine of claim 1 wherein at least one of the shafts (4) and (4') on which the wheels (9) are fixed can move in such a way that it can slide, parallel to the other shaft, remaining in the same plane as originally, with the ends each sitting in a slit (3) and (3') provided therefor, while the shafts are pushed towards each other by a spring (11) or similar device which is situated in each slit (3) and (3') and pushes each movable shaft end towards the other shaft, so that the wheels (9), which are situated opposite each other on the two shafts (4) and (4'), can adjust to a distance which corresponds to the thickness of the bone between them.

4. The machine of claim 1 wherein the scrapers (14) and (14') approach the shape of an ellipse cut through along the longest axis, one end of the curved side of which passes with a greater radius of curvature into the straight side than the other end, and in which this shape is curved in two directions at right angles to each other—at right angles and parallel to the straight side—so that each scraper has a curved profile in top view and in cross-section.

5. The machine of claim 1 wherein the scrapers (14) and (14') face the shafts (4) and (4') with their curved side, so that the curvatures are directed in two perpendicular transverse directions opposite to the direction of movement of the fish bones, at one side scraping at the top and bottom on the side bones, and at the other side scraping along the top and along the bottom against the main bone, while the ends with the smallest radius of curvature of each pair of scrapers, which lie parallel to the shafts (4) and (4'), face each other with a small space between them for the main bone.

6. The machine of claim 1 wherein the scrapers (14) and (14') are fixed at one point and their fixing can be adjusted in a position rotated about that point.

7. The machine of claim 1 wherein at least one additional set of four scrapers is provided, with a different lengthwise measurement, so that a different width of side bones can be scraped off through changing a set of scrapers.

8. The machine of claim 1 wherein the shafts (4) and (4') obtain their opposite directions of rotation through the intervention of gear wheels (5) which are fixed on each of said shafts and mesh with each other, while one of the shafts is driven by an electric motor (27) or some other energy source.

9. The machine of claim 1 wherein by turning a setting screw (12) higher or lower the spring force of spring (11) on the movable shaft (4') is adjustable by causing a greater or smaller compression in rest of the spring (11).

10. The machine of claim 1 wherein the scrapers (14') which are disposed movably are located on the front end of arms (16) and (16'), which are disposed individually pivoting and in their rear point are each drawn upwards by a spring (26) and (26'), and for taking the fish bones between the scrapers (14) and (14') by an arm (17) to be moved downwards are compressed so that the front end and the scrapers (14') connected thereto are removed from the scrapers (14), while the arm (17) to be moved downwards can be moved by means of a lever (19) rotating about a pin (20) and running along the side of the machine, by raising said lever with the hand or knee.

11. The machine of claim 1 wherein the machine comprises two identical bar-shaped structures (1) and (1') provided with slits (3) and (3') which stand on a baseplate (2), while the shafts (4) and (4') are situated above one another with their ends in bearings in said slits, extending from one structure (1) to the other, and the top shaft can be slid up and down in its bearings in said slits, and is pressed down by coil springs (11) disposed in said slits, and the compression of which is adjustable by a screw (12) projecting through the cover plates (10) and (10') of the slits (3) and (3'), while the shafts (4) and (4') along both ends projecting through the slits are provided with double-row gear wheels (5) with long teeth which in each row are arranged at an angle relative to the other row, and which meshing with each other permit a movement of the shafts relative to each other in the direction of the slits (3) and (3').

12. The machine of claim 1 wherein the scrapers (14) and (14') which are disposed so that they move, can be moved up and down by means of electromagnets in order to place a fish bone between the scrapers through the fact that the electromagnets can move a structure on which said scrapers (14') are fixed, while through detection by means of a photoelectric cell they control the downward movement of the scrapers when a fish bone is placed between the scrapers, and control the upward movement when no fish bones are between the scrapers.

* * * * *